United States Patent Office 2,944,032
Patented July 5, 1960

2,944,032

CATALYST MANUFACTURING

William G. Nixon, Westchester, Ill., assignor to Universal Oil Products Company, Des Plaines, Ill., a corporation of Delaware No Drawing. Filed Aug. 7, 1959, Ser. No. 832,155

13 Claims. (Cl. 252—441)

The present application is a continuation-in-part of my co-pending application Serial Number 675,829, filed August 2, 1957, which in turn is a continuation-in-part of co-pending application Serial Number 635,082, filed January 22, 1957.

The present invention relates to a method for manufacturing a catalytic composite and is specifically directed to a novel method of manufacturing a catalytic composite comprising platinum and a refractory inorganic oxide.

Platinum-containing catalytic composites have attained extensive commercial utility; industries such as the pharmaceutical, detergent, petroleum, insecticidal, etc. employ platinum-containing catalysts to promote a multitude of reactions among which are hydrogenation, cyclization, cracking, polymerization, dehydrogenation, sulfonation, alkylation, hydrocracking, oxidation and isomerization. Whatever the particular industry and reaction, it is extremely essential for commercial acceptance that the particular catalyst therein employed exhibit a high degree of activity, as well as the prolonged capability to perform its intended function.

The precise mechanism of catalysis is not fully understood and, therefore, it is extremely difficult to predict accurately, without experimentation, the ultimate results of any process which utilizes a particular catalyst. The manufacture of catalyst is equally unpredictable from the standpoint of consistently producing an acceptable catalyst having a particularly desired activity, and, for the most part, the manufacture of catalyst is an art rather than an exact science. The best manufacturing method quite often produces a catalyst which is unacceptable due to a low degree of activity, and a precise combination of chemical and physical conditions must be adhered to in the manufacturing process. Regardless of the final composition of the finished catalyst, there is a high degree of criticality attached to each and every phase of the manufacturing process. Catalytic composites are generally produced in individual batches, and regardless of the method of manufacture, it is necessary to sample and test each and every batch for activity, with the result that some batches are found thereby to be unacceptable due to a degree of activity which is less than that desired or necessary. This procedure tends to create many unnecessary costs since those batches of catalyst which are found to be unacceptable must be reprocessed. The additional costs which are inherent in reprocessing may actually be twofold: first, the constituents must be reverted to a state such that their reuse is possible, and second, the processing procedure must be repeated.

An object of the present invention is to provide a method of producing a platinum-containing catalyst having a high degree of activity, eliminating the uncertainty and criticality in manufacturing and, therefore, doing away with costly activity testing and reprocessing procedures.

Another object of the present invention is to produce a platinum-containing catalyst having a degree of activity and stability, or capability to function for an extended period of time, which have heretofore not been obtained.

In its most broad embodiment, the present invention relates to a method for manufacturing a platinum component-refractory inorganic oxide catalytic composite which comprises treating the refractory inorganic oxide with aluminum nitrate in an amount of from about 1% to about 10% by weight of the refractory inorganic oxide, impregnating the refractory inorganic oxide with a platinum compound, and treating the resulting platinum component-refractory inorganic oxide composite with an oxide of nitrogen selected from the group consisting of nitric oxide, nitrogen peroxide and mixtures thereof.

In a specific embodiment the present invention relates to a method for manufacturing a catalytic composite which comprises treating alumina with aluminum nitrate in an amount of from about 1% to about 10% by weight of the alumina, impregnating the alumina with chloroplatinic acid to composite platinum therewith, and treating the resulting alumina-platinum composite with at least one oxide of nitrogen selected from the group consisting of nitric oxide and nitrogen peroxide.

In the most specific embodiment, the present invention affords a method for manufacturing an alumina-platinum-chloride composite which comprises treating an alumina-chloride composite with aluminum nitrate in an amount of from about 1% to about 6% by weight of the alumina, drying said composite at a temperature of from about 50° C. to about 200° C., combining platinum therewith in an amount to yield a final catalytic composite comprising from about 0.01% to about 1% by weight of platinum, drying the resulting alumina-platinum-chloride composite at a temperature of from about 50° C. to about 200° C., treating the dried composite with an oxide of nitrogen selected from the group consisting of nitric oxide, nitrogen peroxide and mixtures thereof over a temperature range of from about 200° C. to about 500° C., removing the nitric oxide of nitrogen at a temperature of from about 200° C. to about 600° C., subjecting said composite to air-oxidation at a temperature of from about 200° C. to about 600° C., and thereafter subjecting said alumina-platinum-chloride composite to a reducing treatment with hydrogen at a temperature within the range of about 300° C. to about 1000° C.

Although the method of the present invention is specifically directed to catalytic composites containing platinum, other noble metals, such as iridium, palladium, rhodium and ruthenium and catalytic composites containing other metals can be manufactured advantageously through its use. Other metals can be composited with a refractory inorganic oxide and subsequently employed therewith as components of a catalyst, with or without platinum, or other noble metals present, and these catalysts can be improved in activity and stability by the method of the present invention. Catalytic composites which can be manufactured to a high degree of activity and stability by the method of the present invention comprise metal components such as, but not limited to, cesium, vanadium, chromium, tungsten, cobalt, copper, sodium and other alkali metals, silver, rhenium, molybdenum, nickel, cesium, other metals of groups VI and VIII of the periodic table, mixtures of two or more, etc. The metal component may exist either in the elemental state or in combination as the halide, oxide, nitrate, sulfate, etc. It is understood that the benefits afforded catalysts containing different metal components are not equivalent, and that the effects of employing the method of the present invention with a particular metallic component or mixture of metallic components, are not necessarily the same effects observed with regard to other metal components, or mixtures of metal components.

Generally, the amount of the metal component composited with the catalyst is small compared to the quantities of the other components combined therewith. For example, platinum and/or palladium and other noble metals will generally comprise from about 0.01% to about 5% by weight of the total catalyst, and usually from about 0.1% to about 1% by weight. The use of other metal components, with or without platinum, is dependent upon the use for which the particular catalyst is intended. In any case, however, the concentrations of the metal components will be small, and will generally be within the range of from about 0.01% to about 5% by weight of the total catalyst.

Halogen is generally composited with the catalyst in concentrations of from about 0.01% to about 8% by weight of the total catalyst and may be either fluorine, chlorine, iodine, bromine or mixtures of the same. In general, fluorine and chlorine, particularly fluorine, appear to be less easily removed from the catayst during the manufacture thereof, and the process in which the catalyst is employed, and are, therefore, preferred in many instances. It is understood that the halogen may comprise a mixture of two or more of the aforementioned halogens: a particularly preferred mixture is fluorine and chlorine. The halogen is combined with one or more of the other components of the catalyst, and is, therefore, generally referred to as combined halogen.

Whatever the metal component, it is generally composited with a highly refractory inorganic oxide such as alumina, silica, zirconia, magnesia, boria, thoria, strontia, etc., and mixtures of two or more including silica-alumina, alumina-boria, silica-thoria, silica-alumina-zirconia, etc. It is understood that the refractory inorganic oxides hereinabove set forth are intended to be illustrative rather than limiting unduly the method of the present invention. It is further understood that these refractory inorganic oxides may be manufactured by any suitable method including separate, successive, or co-precipitation methods of manufacture, or they may be naturally occurring substances such as clays or earths which may or may not be purified or activated with special treatment. The preferred refractory inorganic oxide for use in the process of the present invention comprises alumina, either in admixture with other of the aforementioned refractory oxides, or as the sole component of the refractory material selected to serve as the carrier material for the active metallic component.

In the present specification and appended claims, the term alumina is employed to mean porous aluminum oxide in all states of oxidation and in all states of hydration, as well as aluminum hydroxide. The alumina may be synthetically prepared or naturally occurring, and it may be of the crystalline or gel type. Whatever type of alumina is employed, it may be activated prior to use by one or more treatments including drying, calcining, steaming, etc. It may be in a form known as activated alumina, activated alumina of commerce, porous alumina, alumina gel, etc. The various forms of alumina are known by many trivial and trade names and it is intended to include all such forms. The typical aluminas hereinabove set forth are intended to be illustrative rather than limiting on the scope of the present invention.

The alumina may be prepared by adding a suitable alkaline reagent such as ammonium hydroxide to a salt of aluminum such as aluminum chloride, aluminum nitrate, etc., in an amount to form aluminum hydroxide which, upon drying, is converted to alumina. The alumina may be formed into any desired shape such as spheres, pills, extrudates, powder, granules, etc. A preferred form of alumina is the sphere, and alumina spheres may be continuously manufactured by passing droplets of an alumina sol into an oil bath maintained at an elevated temperature, retaining the droplets in said oil bath until the droplets set to firm hydrogel spheroids. The spheres are continuously withdrawn from the oil bath and immediately thereafter subjected to specific aging treatments to impart certain desired physical characteristics thereto. It is not essential to the method of the present invention that the alumina be prepared in any particular manner, and any suitable method will suffice.

The halogen may be added to the composite in any suitable manner, and either before or after the formation of the refractory inorganic oxide. While halogen may be added as such, it may also be added as an aqueous solution of a hydrogen halide or as aluminum halide. The halogen may be added to the refractory oxide before the other components are composited therewith, and this may be accomplished through the use of an acid such as hydrogen fluoride and/or hydrogen chloride. In some cases, volatile salts such as ammonium fluoride, ammonium chloride, etc. may be employed. In other cases the alumina may be prepared from the aluminum halide, which method affords a convenient manner of compositing the halogen while manufacturing the alumina. The halogen may also be composited with the alumina during the impregnation of the latter with the active metallic component.

Whatever the method of manufacture, or the materials and reagents used in said method, the catalytic composite so produced may be improved, both in stability and in the degree of activity, by the method of the present invention. As hereinbefore stated, the present invention provides a method for insuring a highly active catalyst through specific treatments with an acidic compound, particularly aluminum nitrate, and an oxide of nitrogen, particularly nitric oxide and/or nitrogen peroxide. I have found that the combination procedure of either treating the alumina, employed as the catalytically active carrier material, with an acidic compound prior to compositing therewith other catalytic components or adding the acidic compound to the impregnating solution containing the metal component, and thereafter treating the catalytic composite with an oxide of nitrogen prior to high temperature oxidation and the subsequent reducing treatment, yields a catalyst having a degree of activity heretofore not obtained.

The treatment is such that the physical structure of the alumina is changed in such a manner as to permit uniform, thorough penetration of the alumina by the other catalytic components, particularly the platinum component. The impregnation of the alumina, or some other catalytically active carrier material, by the metallic components of the catalyst, has previously been effected in an alkaline solution, or at a pH in excess of 7.0. The carrier material has often been pretreated with a highly alkaline material which treatment is then followed by impregnation by the metallic components in the presence of ammonia or other alkaline material. The impregnation procedure is generally known, therefore, as basic impregnation. As a result of the metallic components being deposited on the surface of the alumina, catalysts produced by such procedures lack the necessary stability to function at high degree of activity for an extended period of time. Attempts have been made to pretreat the alumina with various costly chemical reagents in such a manner as to insure thorough penetration of the alumina. For example, strong mineral acids have been employed, and while they effectively prepare the alumina for impregnation, their use causes at least partial dissolution and/or destruction of the alumina with the result that the final catalytic composite has neither the desired composition and concentration of the various components, nor the physical structure inherently necessary for a high degree of stability. Such mineral acids also result in a non-homogeneous alumina which inherently results in non-uniform distribution of the metallic component therethrough.

I have found that treatment of the alumina, prior to compositing therewith the metallic components of the catalyst, with particular acidic compounds effectively changes the nature and structure of the alumina to insure thorough penetration and dispersion of the metallic components throughout the alumina. In accordance with the method of the present invention, the alumina is treated with an acidic compound such as aluminum nitrate, aluminum sulfate, aluminum carbonate, hydrogen sulfide, boron trifluoride, other acidic compounds, the anion of which comprises bromine, etc. The preferred acidic compounds are such that the nature and structure of the alumina will be changed without effecting detrimental destruction of the alumina itself. I have found aluminum nitrate to be particularly preferred for this purpose; it is understood that other acidic compounds may be employed, although not necessarily with equivalent results. Aluminum bromide, hydrogen bromide and other bromides, the anion of which is a component of the catalyst, may be suitably employed, although, as hereinbefore stated, aluminum nitrate is particularly preferred. The aluminum nitrate is employed in an amount of from about 1% to about 10% by weight of the alumina. These concentrations are such that the pH of the resulting mixture of alumina and aluminum nitrate is maintained within the range of from about 0.2 to about 7.0. Lower concentrations of aluminum nitrate may be suitably utilized, and lie within the range of from about 1% to about 6% by weight of the alumina. When other acidic compounds, such as aluminum bromide, are employed, the concentration of the acidic compound will be dependent upon the pH of the resulting mixture, and it is essential that the pH of the mixture at all times lie within the range of from about 0.2 to about 7.0. As hereinbefore set forth, the preformed alumina may be treated with aluminum nitrate prior to the addition of the metallic component therewith. In some instances, the treatment with aluminum nitrate, or other acidic compounds, may be effected during the addition of the metallic comcomponent to said alumina. For example, when platinum is the desired catalytically active metallic component, it is generally composited with the alumina by means of an aqueous solution of chloroplatinic acid. It is within the scope of the present invention to commingle the chloroplatinic acid with the aluminum nitrate, combining the resulting mixture with the preformed alumina.

The oxides of nitrogen, nitric oxide (NO) and/or nitrogen peroxide ($NO_2$) need not necessarily be employed per se: they may be utilized either in a single treatment as a mixture, or in successive treatments. The oxides of nitrogen may be admixed with various diluents such as but not limited to air, nitrogen, carbon dioxide, etc. Said oxides of nitrogen may result from other compounds and mixtures which either yield the same at reaction conditions, or form them in situ. It is understood that the oxides of nitrogen do not necessarily yield equivalent results, and either oxide of nitrogen may be employed with various metal-containing catalytic composites.

To further improve the activity of the catalyst, it is desirable to subject said catalyst to a reducing treatment. Prior to said reducing treatment, it is preferred that the catalyst is stripped of the oxide of nitrogen by being subjected to a sweeping treatment. The sweeping or stripping agent may be any gaseous substance with which the oxide of nitrogen does not react to form a substance having a detrimental effect upon the catalyst, or which is in itself detrimental to the catalyst. The sweeping treatment is necessarily effected prior to the reducing treatment with hydrogen, since it is well known that hydrogen will react with oxides of nitrogen to form ammonia, exerting thereby a deactivating effect upon the metallic components of the catalyst. Examples of suitable sweeping agents are the following: air, nitrogen, carbon dioxide, mixtures of the same, etc.

Briefly, a specific embodiment of the method of the present invention for the manufacture of a catalytic composite, such as a platinum-alumina-chloride catalyst, comprises treating the alumina with aluminum nitrate in an amount of from about 1% to about 6% by weight of the alumina, to maintain the pH of the resulting mixture within the range of from about 0.2 to about 7.0. The treated alumina is then dried at any suitable temperature within the range of from about 50° C. to about 200° C. Halogen is then composited with the dried alumina when the former is to be a desired component of the final catalytic composite, and if such halogen is not already combined with the alumina. The concentration of halogen in the final composite will be within the range of from about 0.1% to about 8.0% by weight of the finished catalyst. It is believed that the halogen enters into some particular combination with the alumina, and is, therefore, referred to as combined halogen.

The platinum component may be added to the alumina-combined halogen composite through the utilization of any suitable platinum compound, and it is immaterial to the method and essence of the present invention whether the platinum ultimately exists as the element or in some combined state with the other components of the catalytic composite. The essential feature of the present invention is to cause the platinum, after being composited with the alumina, to be contacted with an oxide of nitrogen from the group consisting a nitric oxide, nitrogen peroxide and mixtures thereof. Various means of compositing platinum with a refractory oxide carrier material are well-known and thoroughly defined within the prior art; the utilization of any particular means is not considered to be a limiting factor upon the broad scope of the present invention. Prior art techniques, through which the platinum may be composited with the refractory inorganic oxide carrier material, include impregnating solutions of water-soluble platinum compounds such as platinum tetrachloride; ammonium chloroplatinate, formed through the addition of ammonium hydroxide to a solution of chloroplatinic acid; the treatment of chloroplatinic acid with hydrogen sulfide to form an extremely fine suspension of platinum sulfide; water-insoluble platinum compounds which are generally dissolved in a suitable inorganic acid medium such as hydrogen chloride, sulfuric acid, nitric acid, etc., and other impregnating procedures which employ compounds such as amino-platinum complexes, complexes with metals other than platinum, etc. Of all the prior art techniques for effecting the impregnation of the refractory oxide carrier material, the majority employ a solution of chloroplatinic acid of sufficient concentration to composite the predetermined, desired quantity of platinum. For use in the method of the present invention, I prefer to employ chloroplatinic acid which affords convenience in handling and metering, and does not involve a long, tedious procedure.

The solution of chloroplatinic acid contains platinum in an amount to yield a final catalytic composite which contains from about 0.01% to about 1.0% by weight of platinum. The chloroplatinic acid is commingled with the alumina, or alumina-combined halogen composite in the absence of either an additional alkaline substance, or acidic compounds other than the aluminum nitrate when this particular embodiment is employed. The resulting mixture is sufficiently stirred to obtain intimate contact between the various components, and the alumina-platinum-combined halogen composite is then dried at a temperature of from about 50° C. to about 200° C.

The dried catalytic composite is then subjected to the action of an oxide of nitrogen selected from the group consisting of nitric oxide, nitrogen peroxide and mixtures thereof at a temperature in excess of 25° C. with an upper limit of about 1000° C. Lower temperatures are preferred, and lie within the range of from about 200° C. to about 500° C. Although it has been shown by X-ray diffraction that the oxide of nitrogen effects a reconstitution of the platinum component, it is not definitely known what exact physical transformation takes place. For example, when the catalyst is treated with nitric oxide at a temperature of 200° C., and the temperature is increased during the treatment to a level of 300° C. the platinum which results is shown, by X-ray diffraction, to have a crystallite size of 20 Angstrom units. When, however, the initial temperature of 200° C. is raised to a level of 500° C., the crystallite size of the platinum is increased to 200 Angstrom units. The exact physical nature and/or structure of the platinum is not known, and has not been accurately determined, even through the method of X-ray diffraction. This phenomenon is also apparent when nitrogen peroxide is employed. The use of nitrogen peroxide results in platinum having small crystallite sizes within the range of from about 15 A. to about 50 A., although the exact physical nature and/or structure cannot be determined. I have found this phenomenon to be peculiar to platinum, and such a change in crystallite size is not evidence by the utilization of other gaseous material such as air in ordinary air-oxidation, or through the utilization of an oxide of nitrogen with other metallic components.

The treatment with an oxide of nitrogen is followed by sweeping the catalytic composite with any suitable gaseous material not having a reducing action on the oxide of nitrogen. The preferred method of the present invention employs nitrogen at a temperature of from about 200° C. to about 600° C.; air is employed at a like temperature, following the sweeping treatment with nitrogen, to induce an oxidizing action upon the composite. Thereafter, the catalytic composite is subjected to a reducing treatment at a temperature in excess of 25° C. with an upper limit of about 1000° C. The preferred method employs a temperature of from about 300° C. to about 1000° C. in the presence of hydrogen. It is understood that the treatment with an oxide of nitrogen will impart a high degree of activity to either an oxidized, or un-oxidized catalytic composite. It is preferred, however, after the platinum has been composited therewith and the composite is dried, to treat the composite with the selected oxide of nitrogen: the composite may thereafter be subjected to air-oxidation. It is further understood that the method of this invention may employ downflow or upflow in a closed vessel, or countercurrent or concurrent flow through a fixed, fluidized or continuously moving bed of catalyst.

The following examples are introduced to further illustrate the utility of the present invention and are not intended to limit the same to the specific materials, conditions and/or concentrations involved.

The catalytically active carrier material employed in the exampels comprised alumina containing combined chloride. This composite was prepared from a mixture of equal volumes of a 28% by weight solution of hexamethylene tetramine in water, and an aluminum chloride sol containing 12% by weight aluminum and 10.8% by weight combined chloride. In those examples in which the final catalytic composite contained combined fluoride, the fluoride was composited by way of an aqueous solution of hydrogen fluoride added to the alumina-chloride sol. The mixture was formed into hydrogel spheroids by the oil-drop method: the spheres were washed, dried to a temperature of 650° C. and subsequently calcined at that temperature.

EXAMPLE I

A portion of the calcined spheres was commingled with 99 milliliters of an aqueous solution of chloroplatinic acid containing 10 milligrams of platinum per milliliter, plus 60 milliliters of water. The mixture was evaporated to dryness over a water bath at a temperature of 99° C., and further dried in a rotary drier at a temperature of 200° C. for a period of 3 hours. The composite was thereafter subjected to oxidation at a temperature of 500° C., in the presence of air for a period of one hour.

The air-oxidized catalyst was divided into two portions, one of which was treated, at a temperature of 500° C., with nitric oxide at a rate of about 40 cc./min. for five minutes. The catalyst was then purged briefly with nitrogen, and air-oxidized for a period of one hour to remove traces of nitric oxide. Both catalyst portions were then subjected to a reducing treatment in an atmosphere of hydrogen for a period of one hour at a temperature of 500° C.

The two catalyst portions were then subjected individually to a particular activity-stability test which comprises passing a standard hydrocarbon charge stock, having a boiling range of about 200° F. to about 400° F., through the catalyst at a liquid hourly space velocity (volumes of hydrocarbon charged per volume of catalyst) of 2.0, in an atmosphere of hydrogen present in a mol ratio of hydrogen to hydrocarbon of 6:1 for a period of about 20 hours. The reaction zones were maintained at a temperature of 500° C., and under an imposed pressure of 500 p.s.i.g. The zones were cooled and depressured; the catalyst portions were removed and analyzed for carbon deposition—an indication of the relative stability of the catalysts. Quite often, highly active catalysts will yield excellent results initially, but are insufficiently stable, and rapidly lose their capacity to function acceptably for prolonged periods of time. The liquid product collected from each reaction zone, over the period of the test, was analyzed for octane rating (F–1 clear). The first catalyst portion, that which had not been treated with nitric oxide, is representative of platinum-containing catalysts, and was employed as the standard for comparing catalysts manufactured by the method of the present invention. This standard catalyst is shown in Table I as catalyst A; the catalyst treated with nitric oxide is indicated as catalyst B.

*Table I*

| Catalyst Designation | A | B |
| --- | --- | --- |
| Analysis: | | |
| Platinum, wt. percent | 0.750 | 0.750 |
| Fluoride, wt. percent | 0.350 | 0.350 |
| Chloride, wt. percent | 0.310 | 0.320 |
| Total Halide, wt. percent | 0.66 | 0.67 |
| Carbon on Used Catalyst, wt. percent | 0.69 | 0.63 |
| Octane Rating of Product, F–1 | 94.0 | 94.7 |
| Excess Receiver Gas, s.c.f./bbl | 860 | 910 |
| Excess Debutanizer Gas, s.c.f./bbl | 435 | 431 |
| Total Excess Gas, s.c.f./bbl | 1,295 | 1,341 |
| Debutanizer Gas Ratio | 0.340 | 0.321 |
| Activity Ratings: | | |
| Debutanizer Overhead— | | |
| At same octane | 100 | 93 |
| At same total gas | 100 | 90 |
| Space velocity | 100 | 110 |

For the purpose of a clear understanding of the data, several definitions are necessary:

(1) The excess receiver gas is that quantity of gas in excess of the amount required to maintain the desired pressure in the reaction zone. Analyses have shown that this gas is, for all practical purposes, pure hydrogen (approximately 95 mol percent).

(2) The excess debutanizer gas is that gas which is composed of light paraffins, methane, ethane, propane and butane, and some hydrogen, and results mainly from the hydrocracking reactions within the reaction zone.

(3) The debutanizer ratio is the ratio of excess debutanizer gas to total excess gas, and is indicative of the relative yield of desirable product in the effluent from the reaction zone.

(4) The activity ratings are employed on a comparative basis with respect to the standard: they are first compared at identical octane ratings and total excess gas production, and at equivalent liquid hourly space velocities. In the latter instance, the larger the number, the more active the catalyst; in the former instances, the smaller the number, the greater the yield of high-octane product.

As readily ascertained in the above table, merely treating catalyst manufactured without the use of aluminum nitrate with nitric oxide produces a more active catalyst than the standard. At equivalent octane ratings, the NO-treated catalyst yielded 7% less debutanizer gas; at the same total gas production, there was experienced a 10% decrease in the debutanizer gas; the NO-treated catalyst also indicated a 10% increase in space velocity activity. The quantity of carbon deposited on the catalyst is indicative of the comparative stability of the catalysts, and in the instant example, although catalyst B was the more active catalyst, less carbon was deposited thereon.

EXAMPLE II 130 grams of alumina-combined chloride spheres were impregnated with 3 grams of aluminum nitrate $$Al(NO_3)_3 \cdot 9H_2O$$

dissolved in 220 milliliters of water, and were subsequently dried on a water bath at a temperature of 100° C. The alumina was then impregnated with an aqueous solution of chloroplatinic acid in an amount sufficient to yield a final catalyst containing 0.709% by weight of platinum. The alumina-platinum-chloride composite was dried and oxidized in a stream of air for a period of three hours at a temperature of 200° C. The oxidized catalyst with treated with nitrogen peroxide at a rate of about 40 cc./min. for five minutes. The nitrogen peroxide was first introduced at a temperature of 200° C., which temperature was increased to 300° C. The catalyst was then air-oxidized from 300° C. to 500° C. and one hour at 500° C. to remove oxides of nitrogen and thereafter subjected to a reducing treatment in the presence of hydrogen at a temperature of 500° C. for a period of one hour. This catalyst was designated as catalyst C, and was subjected to the activity test previously described.

A second portion of alumina spheres, containing both combined fluoride and combined chloride was impregnated with aluminum nitrate and chloroplatinic acid as hereinabove described. This composite was treated with nitric oxide, at a temperature of 200° C. to 300° C.; traces of nitric oxide were removed with nitrogen at a temperature of 500° C., followed by air at a like temperature, and the catalyst then subjected to a reducing treatment in the presence of hydrogen at a temperature of 500° C. This catalyst was designated as catalyst D, and the results of the activity test to which the catalyst was subjected are given in Table II, along with the results of the test of catalyst C.

Table II

| Catalyst Designation | C | D |
|---|---|---|
| Analysis: | | |
| Platinum, wt. percent | 0.709 | 0.76 |
| Fluoride, wt. percent | | 0.35 |
| Chloride, wt. percent | 0.70 | 0.21 |
| Total Halide, wt. percent | 0.70 | 0.56 |
| Carbon on Used Catalyst, wt. percent | 0.32 | |
| Octane Rating of Product, F-1 | 94.6 | 94.0 |
| Excess Receiver Gas, s.c.f./bbl | 940 | |
| Excess Debutanizer Gas, s.c.f./bbl | 431 | |
| Total Excess Gas, s.c.f./bbl | 1,371 | |
| Debutanizer Gas Ratio | 0.314 | 0.308 |
| Activity Ratings: | | |
| Debutanizer Overhead— | | |
| At same octane | 93 | 90 |
| At same total gas | 85 | 88 |
| Space Velocity | 105 | 103 |

EXAMPLE III 130 grams of the calcined alumina-combined chloride spheres was impregnated with 3 grams of aluminum nitrate dissolved in 220 milliliters of water. The mixture was evaporated to dryness over a water bath, and further dried in air at a temperature of 200° C. The dried spheres were then impregnated with a sufficient quantity of chloroplatinic acid to yield a final catalyst containing 0.609% by weight of platinum. The resulting mixture was dried as hereinbefore described, and treated with nitric oxide. The nitric oxide was introduced, after a brief nitrogen sweep to remove air, at a temperature of 200° C., which temperature was increased to 500° C. during the treatment. Traces of nitric oxide were removed with nitrogen at a temperature of 500° C., and the catalyst subjected to air-oxidation at a temperature of 500° C. The oxidized catalyst was then subjected to a reducing treatment in a stream of hydrogen. This catalyst was designated as catalyst E, and subjected to the activity test previously described. The results are indicated in Table III, and compared to the results of catalysts A and D, the latter being repeated for the sake of convenience and clarity.

Table III

| Catalyst Designation | A | D | E |
|---|---|---|---|
| Analysis: | | | |
| Platinum, wt. percent | 0.75 | 0.76 | 0.609 |
| Fluoride, wt. percent | 0.35 | 0.35 | |
| Chloride, wt. percent | 0.31 | 0.21 | 0.75 |
| Total Halide, wt. percent | 0.66 | 0.56 | 0.75 |
| Carbon on Used Catalyst, wt. percent | 0.69 | | 0.58 |
| Octane Rating of Product, F-1 | 94.0 | 94.0 | 96.4 |
| Excess Receiver Gas, s.c.f./bbl | 860 | | 977 |
| Excess Debutanizer Gas, s.c.f./bbl | 435 | | 413 |
| Total Excess Gas, s.c.f./bbl | 1,295 | | 1,390 |
| Debutanizer Gas Ratio | 0.340 | 0.308 | 0.297 |
| Activity Ratings: | | | |
| Debutanizer Overhead— | | | |
| At same octane | 100 | 90 | 82 |
| At same total gas | 100 | 88 | 80 |
| Space Velocity | 100 | 103 | 133 |

The catalyst produced by the particularly preferred method of the present invention, catalyst E, although containing less platinum, is a much more active catalyst than the standard catalyst (catalyst A). It also possesses a greater degree of activity than catalysts prepared in accordance with other embodiments of the present invention.

A portion of each of the two catalysts, D and E, were analyzed by X-ray diffraction to determine what differences were evident, if any, to which the unexpected results obtained with catalyst E could be attributed. As hereinbefore stated, catalyst E was prepared by the same method as catalyst D with one exception—the treatment with nitric oxide was effected over a temperature range of 200° C. to 500° C., rather than 200° C. to 300° C. The results of the analyses by X-ray diffraction indicated that the platinum of catalyst E was physically different from catalyst D, in that the platinum crystallite sizes were 200 A. and 20 A. respectively. This physical difference results in the unusual activity and stability of the catalyst prepared by the preferred method of the present invention utilizing nitric oxide over a temperature range of about 200° C. to about 500° C.

The foregoing examples clearly indicate the benefits afforded through the utilization of the several embodiments of the present invention.

I claim as my invention:

1. A process for manufacturing a catalyst which comprises treating alumina with aluminum nitrate in an amount of from about 1% to about 10% by weight of the alumina, impregnating said alumina with a platinum compound to form an alumina-platinum composite, and treating said alumina-platinum composite with at least one oxide of nitrogen selected from the group consisting of nitric oxide and nitrogen peroxide.

2. The method of claim 1 further characterized in that said oxide of nitrogen is nitric oxide.

3. The method of claim 1 further characterized in that said oxide of nitrogen is nitrogen peroxide.

4. A process for manufacturing a catalyst which comprises treating alumina with aluminum nitrate in an amount of from about 1% to about 10% by weight of the alumina, impregnating the alumina with chloroplatinic acid to composite platinum therewith, and treating the resultant platinum-alumina composite with at least one oxide of nitrogen selected from the group consisting of nitric oxide and nitrogen peroxide.

5. A method for manufacturing an alumina-platinum catalytic composite which comprises treating said alumina with aluminum nitrate in an amount of from about 1% to about 10% by weight of the alumina, drying the alumina, impregnating the dried alumina with chloroplatinic acid to composite platinum therewith in an amount to yield a final composite comprising from about 0.01% to about 1.0% by weight of platinum, treating the resulting alumina-platinum composite with nitric oxide, removing the nitric oxide with nitrogen, subjecting said composite to air-oxidation, and thereafter subjecting the alumina-platinum composite to reduction in the presence of hydrogen.

6. The method of claim 5 further characterized in that said nitric oxide treatment is effected at a temperature within the range of about 25° C. to about 1000° C.

7. The method of claim 5 further characterized in that said nitric oxide is removed with nitrogen at a temperature of from about 200° C. to about 600° C.

8. A method for manufacturing an alumina-platinum catalytic composite which comprises treating said alumina with aluminum nitrate in an amount of from about 1% to about 10% by weight of the alumina, drying the alumina at a temperature of about 50° C. to about 200° C., impregnating the dried alumina with chloroplatinic acid in an amount to yield a final composite comprising from about 0.01% to about 1.0% by weight of platinum, treating the resulting alumina-platinum composite with nitric oxide at a temperature of from about 25° C. to about 1000° C., removing the nitric oxide with nitrogen at a temperature of from about 200° C. to about 600° C., subjecting the composite to air-oxidation at a temperature of from about 200° C. to about 600° C., and thereafter subjecting the alumina-platinum composite to a reducing treatment effected at a temperature of from about 300° C. to about 1000° C. and in the presence of hydrogen.

9. The method of claim 8 further characterized in that said aluminum nitrate is employed in an amount of from about 1% to about 6% by weight of the alumina.

10. The method of claim 8 further characterized in that said alumina-platinum composite contains combined halogen.

11. The method of claim 8 further characterized in that said alumina-platinum composite is treated with nitric oxide over a temperature range of about 200° C. to about 300° C.

12. The method of claim 8 further characterized in that said aluminum-platinum composite is treated with nitric oxide over a temperature range of from about 200° C. to about 500° C.

13. A method for manufacturing an alumina-platinum-chloride composite which comprises treating an alumina-chloride composite with aluminum nitrate in an amount of from about 1% to about 6% by weight of the alumina, drying said composite at a temperature of from about 50° C. to about 200° C., combining platinum therewith in an amount to yield a final catalytic composite comprising from about 0.01% to about 1% by weight of platinum, drying the resulting alumina-platinum-chloride composite at a temperature of from about 50° C. to about 200° C., treating the dried composite with an oxide of nitrogen selected from the group consisting of nitric oxide, nitrogen peroxide and mixtures thereof over a temperature range of from about 200° C. to about 500° C., removing the oxide of nitrogen at a temperature of from about 200° C. to about 600° C., subjecting said composite to air-oxidation at a temperature of from about 200° C. to about 600° C., and thereafter subjecting said alumina-platinum-chloride composite to a reducing treatment with hydrogen at a temperature within the range of about 300° C. to about 1000° C.

References Cited in the file of this patent

UNITED STATES PATENTS

| | | |
|---|---|---|
| 1,923,652 | Winkler | Aug. 22, 1933 |
| 2,209,458 | Heard | July 30, 1940 |
| 2,277,512 | Simo | Mar. 24, 1942 |
| 2,566,521 | Haensel | Sept. 4, 1951 |
| 2,662,860 | Engel | Dec. 15, 1953 |
| 2,761,819 | Dinwiddie | Sept. 4, 1956 |
| 2,781,324 | Haensel | Feb. 12, 1957 |